July 10, 1956     G. C. PEARCE     2,754,404
DOMESTIC APPLIANCE
Filed Feb. 25, 1953
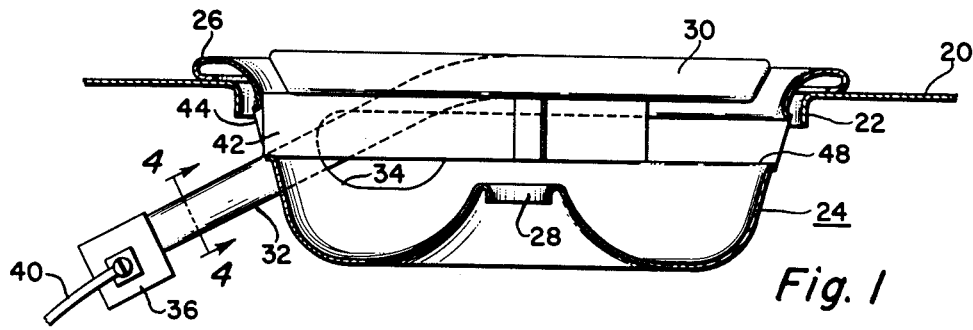
Fig. 1
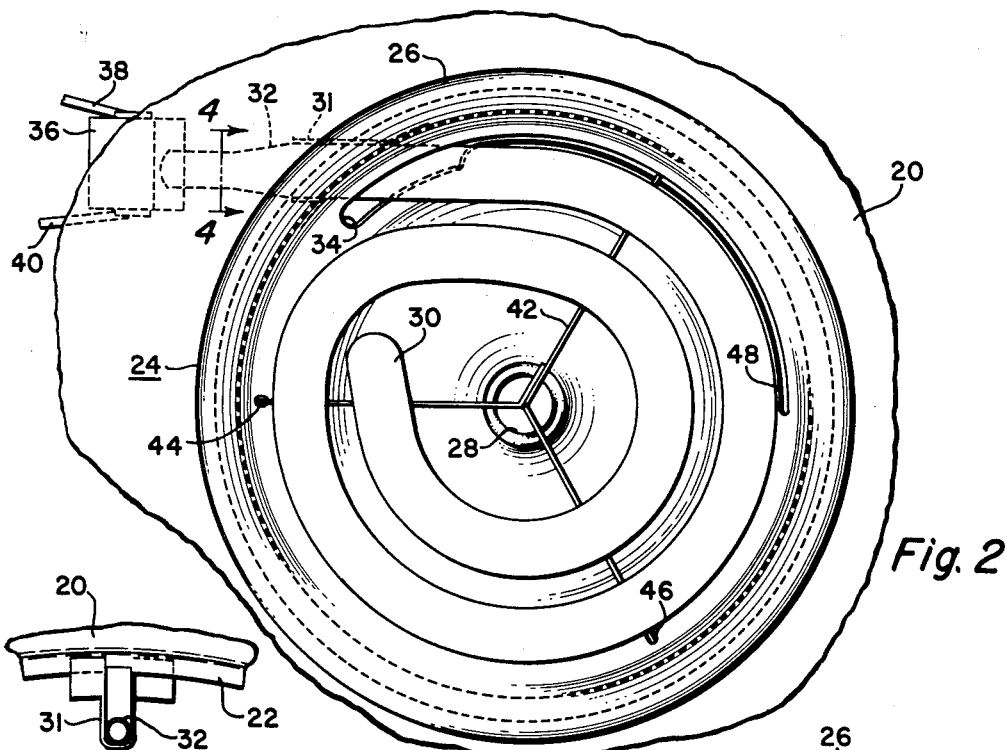
Fig. 2
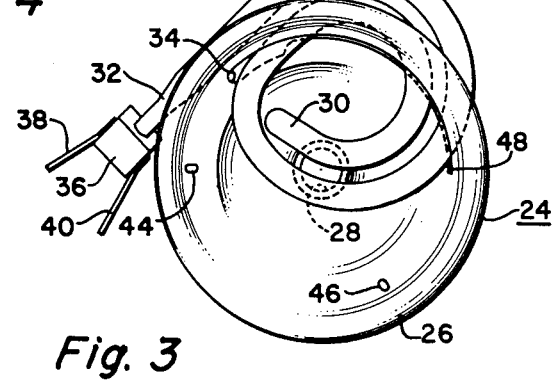
Fig. 4
Fig. 3
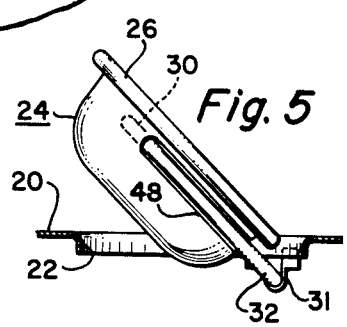
Fig. 5
INVENTOR.
George C. Pearce
BY *R. R. Landor*
His Attorney

United States Patent Office 2,754,404
Patented July 10, 1956

2,754,404

DOMESTIC APPLIANCE

George C. Pearce, Dayton, Ohio, assignor to General Motors Corporation, Detroit, Mich., a corporation of Delaware Application February 25, 1953, Serial No. 338,707

5 Claims. (Cl. 219—37)

This invention relates to a domestic appliance and more particularly to a surface heating arrangement for the range top of an electric range.

Electric ranges have been provided with surface heating arrangements which are somewhat similar to that shown in the Fry Patent 2,569,753. In such an arrangement the range top 10 is provided with flanged openings 11, 12 which are provided with a trim ring ordinarily chrome plated. Supported within the trim ring is a combined reflector and drip pan 29. The tubular sheath type surface heating unit 20 rests upon a spider-shaped support which is supported in slots in the reflector 29.

Such a surface heating arrangement is somewhat difficult to keep clean because there is no arrangement whereby the drip pan 29 can be readily removed from the range and cleaned in a sink. The trim ring is merely decorative for the most part and is a somewhat unnecessary item of expense.

It is an object of the present invention to provide a surface heating arrangement wherein the trim ring 15 is eliminated and all of the parts excepting the heating element itself may be readily removed from the range by any housewife for cleaning.

It is another object of this invention to provide a surface heating arrangement in which the drip pan is provided with a continuous rim which replaces the customary trim ring and yet is arranged so that the drip pan may be easily removed from the range.

These and other objects are attained in the form shown by providing a drip pan having a continuous rim large enough in diameter to rest upon the edges of the surface unit aperture in the top of the range. The drip pan is provided with a long aperture below but parallel to the continuous rim extending in an arc sufficiently long that the entire surface heating unit may be slipped through the aperture for insertion and removal of the drip pan.

Further objects and advantages of the present invention will be apparent from the following description, reference being had to the accompanying drawings wherein a preferred form of the invention is clearly shown.

In the drawing:

Figure 1 is a vertical sectional view through a surface heating arrangement embodying one form of my invention;

Figure 2 is a top view of the arrangement shown in Figure 1;

Figure 3 is a smaller top view showing how the surface heating unit can be removed from the drip pan;

Figure 4 is a fragmentary sectional view taken along the lines 4—4 of Figures 1 and 2; and Figure 5 is a view in elevation of the pan and surface heater tilted up for easy removal.

Referring now to the drawing, there is shown a portion 20 of the top of a domestic electric range provided with a flanged surface unit aperture 22. Within this aperture 22 is a drip pan 24 somewhat in the shape of a bowl having a continuous rim 26 which is curled under as shown in Figure 1. This continuous rim 26 is considerably larger in diameter than the aperture 22 so that it rests upon the bordering portions of the large top 20 as shown in Figure 1. The drip pan 24 has a raised central portion provided with an overflow aperture 28.

The surface heating unit 30 is of the tubular sheath type in which the sheath is somewhat triangular in cross-section. This sheath heater is formed into the shape somewhat similar to a flat spiral as shown in Figure 2. The heater 30 has a terminal portion 32 extending tangentially from the spiral portion and downwardly at an angle of about 30° from the plane of the spiral.

The side wall of the drip pan 24 below the rim 26 is provided with a large aperture 34 through which extends the terminal portion 32. The terminal portion 32 terminates in a terminal block 36 beneath the range top 20. Attached to the sides of this terminal block are the electrical conductors 38 and 40 which are preferably quite flexible so that the surface heating unit 30 can be moved or rotated a limited distance. The range top 20 is provided with a hinge or bearing 31 which holds the terminal portion 32 but permits its rotation. Separate from the heating unit and the drip pan 24 is a three-armed support 42 upon which rests the surface heater 30. This support 42 may be arranged in any suitable manner. For example, two of the arms of the support 42 are held within the notches 44 and 46 in the side walls of the drip pan 24. These supports 42 are made of strips of aluminum coated steel having square ends and joined together at the center to make a three-pronged shape.

According to the present invention, the large aperture 34 is elongated in a direction parallel to the rim 26 but beneath the rim substantially on the same level as the support 42. This extension 48 of the aperture 34 has its lower edge at the same level as the lower edges of the notches 44 and 46 so that it readily serves as the support for one arm of the support 42. The support 42 can be readily removed merely by first lifting up the surface heating unit 30 and simply lifting the support 42 out of the drip pan 24.

The aperture 34 together with its extension 48 is sufficiently long and sufficiently wide so that the surface heating unit 30 can pass through it as shown in Figure 3. The aperture 34 together with its extension 48 is slightly longer than the smallest diameter of the spiral portion of the surface heater 30. Its width or height is slightly greater than the surface heating unit 30. Through this arrangement, after the support 42 has been removed, the drip pan 24 may be removed by slipping the surface heater 30 through the aperture 34 and its extension 48 as shown in Figure 3 so that it and the support 42 can be washed in the sink away from the range.

The surface heating unit 30 can be pivoted on the hinge or bearing 31 partially out of the aperture 22 for cleaning. If it is desired to completely remove the surface heating unit 30 it is merely necessary to disconnect the hinge 31 and the conductors 38 and 40. However, the disconnection of these conductors 38 and 40 is not necessary when it is only desired to remove the support 42 and the drip pan 24. The drip pan 24 also serves as a reflector. The extension 48 is located in such a position that little heat is lost through it. The drip pan 24 is provided with tapered side walls so that the support 42 may be readily supported in the apertures 44, 46 and 48 without interfering with its ready removal.

While the form of embodiment of the invention as herein disclosed constitutes a preferred form, it is to be understood that other forms might be adopted as may come within the scope of the claims which follow.

What is claimed is as follows:

1. A surface heating arrangement for the surface unit aperture in the range top of an electric range which includes a bowl shaped removable drip pan having a continuous seamless integral rim large enough in diameter to rest upon the edges of a surface unit aperture in a range top, said rim being integral with said pan, a sheathed tubular type surface heating unit generally in the form of a flat spiral with its terminal portion extending tangentially, a support separate from said heating unit and said pan normally located below said heating unit in supporting relationship and resting upon said pan, said pan having in its upwardly extending wall a long aperture spaced below the continuous rim having a length and width slightly greater than the thickness and width of the flat spiral portion of the heating unit across its minimum diameter and through which normally extends said terminal portion.

2. A surface heating arrangement for the surface unit aperture in the range top of an electric range which includes a bowl shaped removable drip pan having a continuous seamless integral rim large enough in diameter to rest upon the edges of a surface unit aperture in a range top, said rim being integral with said pan, a support separate from said pan but normally mounted in said pan, said support having a plurality of arms, said pan being provided with support arrangements for the end portions of said arms, said pan being provided with an aperture with a continuous endless bounding edge below said continuous rim, a surface heating unit mounted upon but separate from said support, said surface heating unit having its terminal portion normally extending through said aperture, said aperture having dimensions sufficiently large and having such a contour that the major portion of the surface unit above said support may pass through it.

3. A surface heating arrangement for the surface unit aperture in the range top of an electric range which includes a bowl shaped removable drip pan having a permanently connected continuous upper outwardly extending flange large enough in diameter to rest upon the edges of a surface unit aperture in a range top, said flange being a permanent structural part of said pan, said pan having a side wall containing a long aperture with a continuous endless bounding edge a short distance below the continuous flange extending through an arc between 120° and 180°, a surface heating unit within said pan having a terminal portion extending through said aperture, said aperture being sufficiently wide and long to allow the passage therethrough of the largest portion of said surface heating unit.

4. A surface heating unit arrangement for the surface heating unit aperture in the range top of an electric range which includes a surface heating unit having a terminal portion, a hinge connection between the terminal portion and the range top adjacent said aperture, a removable drip pan having a permanently connected continuous outwardly extending flange sufficiently large in diameter to rest upon the edges of the surface unit aperture, said flange being a permanent structural part of said pan, said drip pan having a side wall containing an elongated aperture with a continuous endless bounding edge a short distance below said flange sufficiently large to slip over the largest portion of said heating unit into and out of place within said aperture without disconnection of the heating unit from the range.

5. A surface heating unit arrangement for the surface heating unit aperture in the range top of an electric range which includes a surface heating unit having a terminal portion, a hinge connection between the terminal portion and the range top adjacent said aperture, a removable drip pan having a permanently connected continuous outwardly extending flange sufficiently large in diameter to rest upon the edges of the surface unit aperture, said flange being a permanent structural part of said pan, said drip pan having a side wall containing an elongated aperture with a continuous endless bounding edge a short distance below said flange sufficiently large to slip over the largest portion of said heating unit into and out of place within said aperture without disconnection of the heating unit from the range, and removable supporting means separate and independent of said pan and surface heating unit located within said pan for supporting said unit.

References Cited in the file of this patent

UNITED STATES PATENTS

| | | |
|---|---|---|
| 661,190 | Olson | Nov. 6, 1900 |
| 1,319,024 | Warfield | Oct. 14, 1919 |
| 2,260,790 | Russell | Oct. 28, 1941 |
| 2,260,793 | Russell | Oct. 28, 1941 |
| 2,418,520 | Morton | Apr. 8, 1947 |
| 2,506,554 | Tuttle | May 2, 1950 |
| 2,508,552 | Tuttle | May 23, 1950 |
| 2,624,827 | Young | Jan. 6, 1953 |
| 2,633,524 | Smith | Mar. 31, 1953 |
| 2,667,564 | Cunningham | Jan. 26, 1954 |

FOREIGN PATENTS

| | | |
|---|---|---|
| 999,605 | France | Feb. 6, 1952 |